INVENTORS.
Jack B. Reynolds
Robert A. Stowe
BY John M. DeMenter
ATTORNEY

INVENTORS.
Jack B. Reynolds
Robert A. Stowe
BY
ATTORNEY

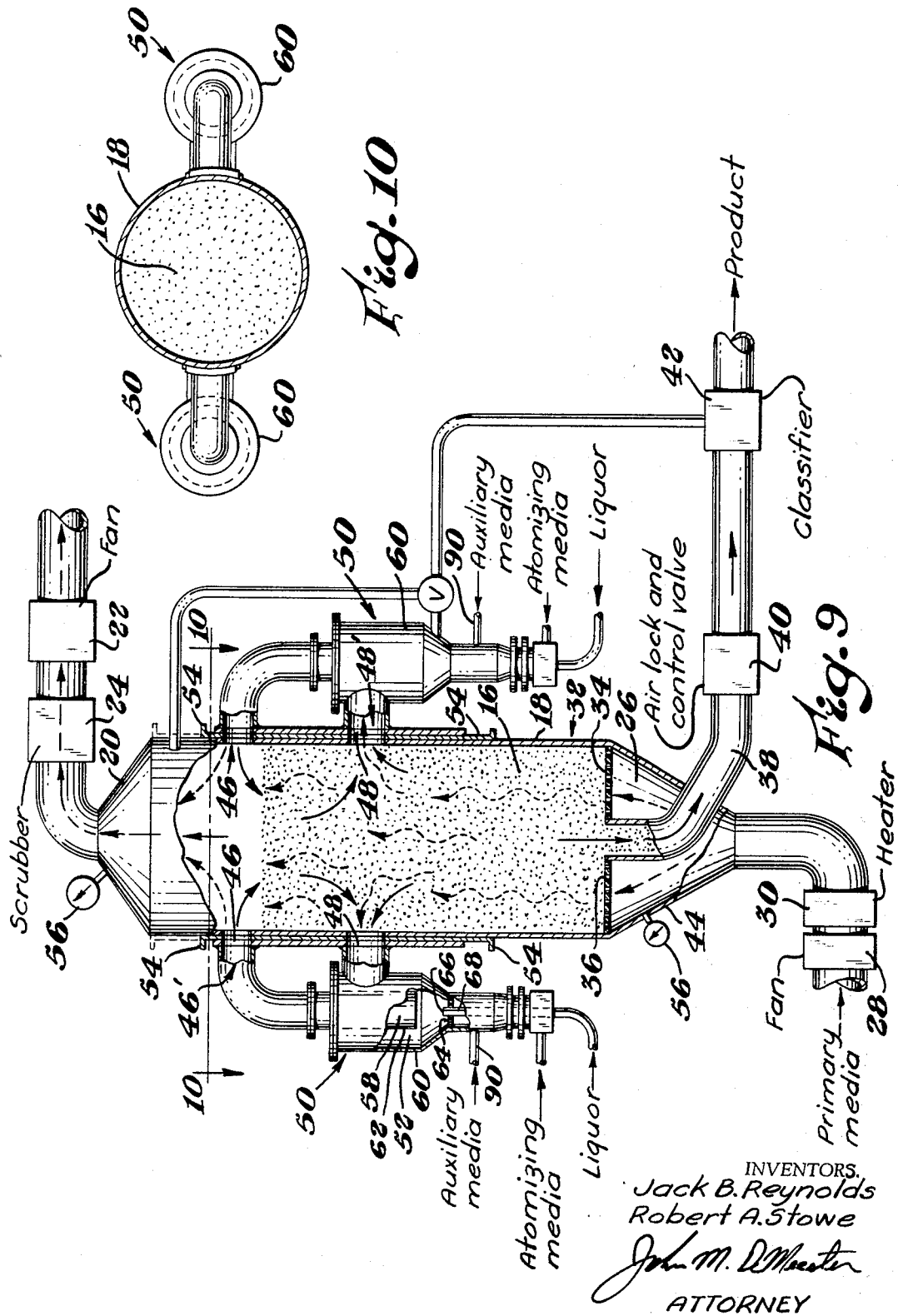

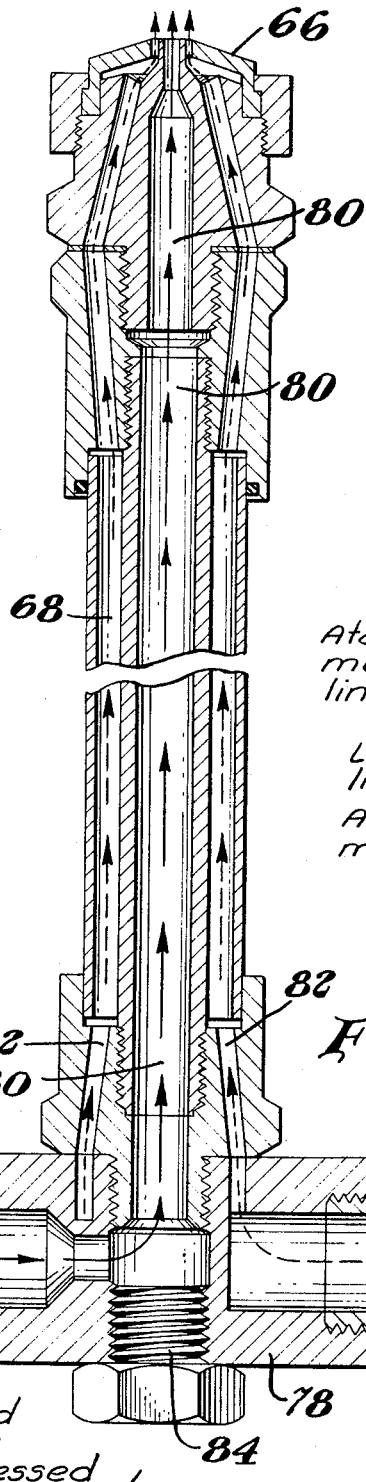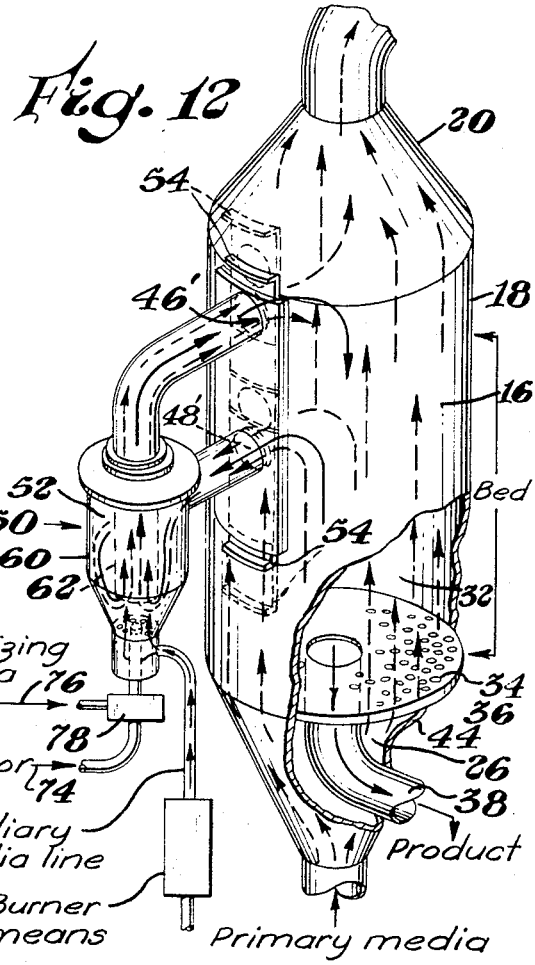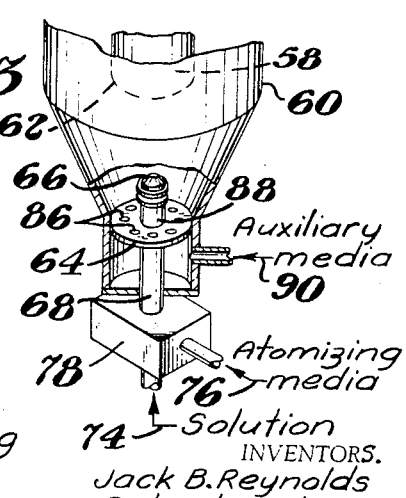

United States Patent Office 3,408,746
Patented Nov. 5, 1968

3,408,746
APPARATUS AND METHOD FOR RECOVERING SOLIDS
Jack B. Reynolds and Robert A. Stowe, Ludington, Mich., assignors to The Dow Chemical Company, Midland, Mich., a corporation of Delaware
Filed Mar. 13, 1967, Ser. No. 622,519
7 Claims. (Cl. 34—10)

ABSTRACT OF THE DISCLOSURE

This specification discloses an apparatus and method for separating solids from liquid mixtures wherein the solids are recovered as pellets; the apparatus comprising a main drying chamber through which drying gases are passed from the bottom to the top through a bed of said pellets, at least one draft tube assembly located externally of said main chamber, including atomizing means therein, through which pellets are recycled, and means to withdraw pellets from the apparatus and exhaust gases therefrom. In the method disclosed solid pellets are recycled with the aid of pneumatic gaseous media from the drying chamber through the external draft tube assembly where a liquid mixture of solids is atmozied onto the recycling pellets to deposit and accumulate solids thereon, whereupon, the pellets so-coated return to the main chamber for drying and recycling.

---

It is an object of the present invention to provide a new and improved method and apparatus whereby solids may be readily and continuously recovered from a liquid mixture thereof in a particulate, essentially spherical, high density form which is hard, free-flowing, dustless and which may readily be handled.

Another object of the invention is to provide a new and novel method and apparatus whereby a wide variety of dry, coated, particulated pellets may be readily produced at uncommonly high heat efficiencies.

A further object of the invention is to provide a new and unique method and apparatus whereby particulate substances may be uniformly coated with other materials in a continuous recycling manner and dried to produce pellets of any reasonable size.

Another object of the present invention is to provide a method and apparatus for recovering a wide variety of solids from a liquid as a coating on a base substance either foreign or common to the material being recovered. An additional object of the invention is to provide a novel apparatus of variable capacity which is relatively simple in construction and operation, and which is uncommonly efficient in the utilization of heat, the apparatus being characterized by a facility of being easily and rapidly cleaned, and cleared or unplugged without totally shutting down operation of the device.

A yet further object of the invention is to provide an apparatus for continuously coating particles wherein essentially each particle being so-coated is rapidly recycled through the apparatus while providing near equal exposure to a liquid coating material being applied thereon.

Other objects and advantages of the present method and apparatus will become apparent in the course of the following specification when considered with the accompanying drawings wherein.

FIG. 9 is a side elevational view, partially in section, of one embodiment of the apparatus of the present invention illustrating the relative positioning of essential elements thereof and showing a central or main chamber in communication with two oppositely positioned external concentric draft tube assemblies, including recycle means, each assembly being attached to and in communication with the side wall of said main chamber.

FIG. 10 is a plan view, in section, of the apparatus of FIG. 9 taken along line 10—10.

Figure 1:
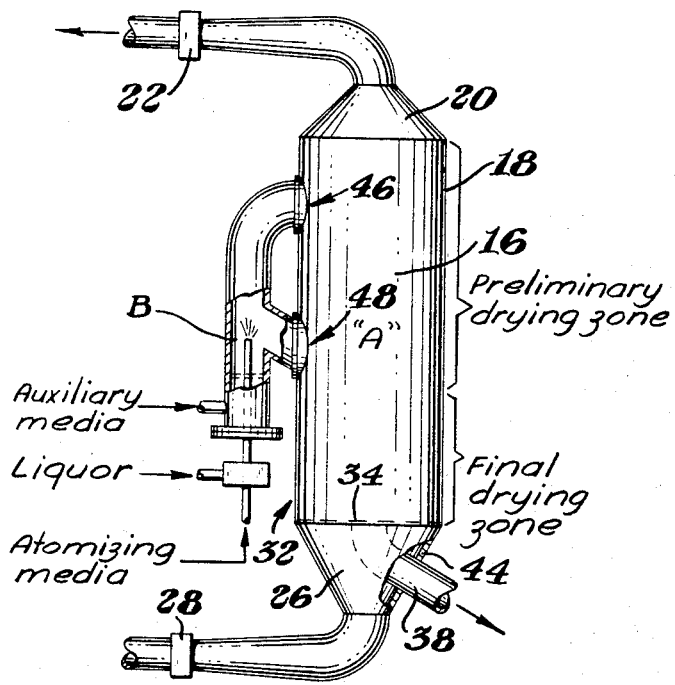
FIG. 1 is a side elevational view, partially cutaway and in section, of one basic embodiment of the apparatus of the present invention, showing a main chamber A and a draft tube assembly B.

FIG. 11 is a side elevational view, in section, of an elongated typical multi-fluid nozzle, including feed and gas inlets, which may be employed in a draft tube assembly such as shown, for example, in FIGS. 1, 9 or 12.

FIG. 12 is an isometric view, partially cutaway and in section, of another embodiment of the apparatus employing an external concentric draft tube assembly, including a nozzle subassembly, coupled with intermediate slide gate arrangements to a side wall portion of a main chamber, and showing also by use of arrows the recycling flow of solid particulate material (solid arrows) and the flow of the various gaseous media and liquids (dotted arrows) therein.

FIG. 13 is a side elevational view, partially cutaway and in section, showing the lower pendent portion of a concentric draft tube assembly including a nozzle subassembly carried therein.

Figure 2:
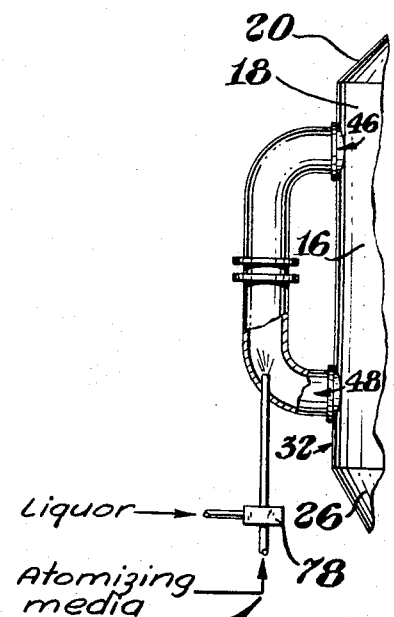
FIG. 2 is a side elevational view, partially cutaway and in section, of another basic embodiment of a basic draft tube assembly in accordance with the present invention.

Basically, the versatile apparatus of the present invention comprises two cooperating elements consisting of (A) a main chamber adapted to contain a bed of particles or pellets, and (B) at least one cooperating external draft tube assembly, each said assembly basically comprising a draft tube and a fluid nozzle subassembly. One embodiment of the very basic invention is shown in FIG. 2.

MAIN CHAMBER

The main chamber element of the novel device comprises, in general, a vessel capable of containing a bed of particles. The top of the vessel or chamber is normally closed and adapted, such as, for example, by a hood means, to collect (during operation) gaseous media which pass, for example, upwardly through said bed of particles from below in the main chamber. In conjunction with the hood are exhaust means, such as a fan, to exhaust said gases therefrom for further treatment or the recovery of the constituents therein, or, to be discarded. Normally, but optionally, dust collector means and so-called scrubber means to cleanse the gaseous media of fines, etc., are also provided in communication with said hood.

At or near the bottom portion of the main chamber is provided a plenum means connected by suitable duct work to a heater means for forceably introducing during operation, hot air, or other gases, such as, for example, hot flue and/or combustion gases under pressure upwardly, as aforesaid, through the chamber and pellet bed, said gases being called herein the "primary media gases."

Interposed between said plenum means and the main chamber is a grid plate to support said bed of moving and/or fluidized particles in the chamber. Normally in the main chamber A there is designated a preliminary drying zone and preferably a final drying sub-zone as shown, for example, in FIG. 1. The final drying zone, which is that portion of the bed located below the inlet into the draft tube assembly, provides for drying of the pellets in said portion to an anhydrous condition in those cases where an anhydrous pellet product is desired and possible. Accordingly, when a hydrated or hydrous product is desired only a so-called preliminary drying zone may be provided.

An opening as an inlet into the draft tube assembly from the main chamber, as well as an outlet from the top of said assembly into the upper portion of the main chamber are located in and carried by the chamber side wall to accommodate each draft tube assembly element of the apparatus. In addition, means are provided at the lower end of the chamber for controllably withdrawing dried particles from the pellet bed in the main chamber, normally from the final drying zone thereof. Optionally included with said pellet withdrawing means are means to classify said pellets as to size, such as, for example, by a column of graduated screens. To maintain a desired pressure in the main chamber, means are provided, such as, e.g., an air lock type valve employed in conjunction with the pellet withdrawing means.

DRAFT TUBE ASSEMBLY

The draft tube assembly in its basic form comprises an enclosed external passage means, herein called a draft tube, externally communicating the lower portion of the main chamber by the aforesaid inlet with the upper portion of the chamber by said outlet, there being introduced near the inlet of said draft tube a fluid nozzle subassembly for introducing into the draft tube liquids to be processed which will hereinafter be more fully described. Preferably, the draft tube will be adapted with a pendent portion which serves to carry and house at least the fluid nozzle portion of the subassembly. The inlet and outlet means of the draft tube assembly provide during operation for the receipt and discharge therethrough of particles from and into the main chamber, respectively, in a recycling manner wherein said particles are contacted with the atomized liquid mixture to be processed at a temperature at least above its freezing point, thereby to coat the particles passing through the draft tube, as will be described.

The basic nozzle subassembly consists essentially of a fluid nozzle, liquid feed lines and suitable valves for controlling their flow, including an inlet for gaseous atomizing media if needed, such as shown in FIGS. 1 and 2.

As aforesaid, the nozzle subassembly will preferably include means to enclose or house at least the fluid nozzle portion thereof; and this enclosure may be integrally constructed as part of the draft tube assembly or as a separate pendently attached portion to the lower part of the draft tube assembly near the draft tube inlet. Transversely positioned on the shank of the nozzle between its tip and inlet end is moveably coupled a multi-orifice plate through which so-called auxiliary media gases may be passed upwardly into and through the draft tube. The plate also contains or supports the pellets in the draft tube assembly. For convenience, guide and stop means may be provided rigidly coupled to said orifice plate for easy positioning of at least the nozzle tip into or near the draft tube inlet. Normally, said plate will be of a cross-sectional size just slightly less than that of the draft tube portion or pendent housing into which it fits and is carried to obtain a tight fit.

Means for introducing auxiliary media gases is carried by the wall of the draft tube or draft tube assembly, auxiliary gaseous inlet means being adapted and provided such that the auxiliary media passes through the multi-orifice plate before actually entering the draft tube. The auxiliary gases pass through the multi-orifice plate to, inter alia, assist movement of solid particles through the draft tube assembly, thus acting in the nature of a pneumatic pump to aid upward movement of pellets through the draft tube.

While the vertical distance between the inlet of the draft tube assembly and the outlet thereof is not particularly critical other than to determine to some extent the depth of the aforesaid preliminary pellet drying zone, the inlet is invariably located on a level below the outlet but sufficiently above the top of the grid plate in the main chamber to provide an adequate depth of final drying zone, if a final drying zone is desired or necessary.

The cross-sectional size of the draft tube may be varied depending on other variables of the invention but will generally depend on the number of draft tube assemblies, and size and capacity of the main chamber.

The following brief description of each draft tube assembly embodiment of FIGS. 1 through 4 will facilitate understanding of the present apparatus of the invention and its scope.

FIG. 1 shows a vertically disposed inverted Y shaped draft tube assembly with a downwardly projecting pendent portion, into which the aforesaid nozzle subassembly fits and auxiliary media gases are introduced. The lower communication with the main chamber is the inlet into the assembly, the upper opening being the outlet. Normally, regardless of the type draft tube assembly employed in the invention, these inlets and outlets are suitably and independently valved to control the flow of pellets therethrough, for example, such as by independently operated slide gate means.

FIG. 2 shows a very basic C shaped draft tube assembly having an elongated fluid nozzle, the tip thereof extending into the draft tube, the other end of the nozzle being adapted with a valve, a liquor feed line, and an atomizing media gas line.

Figure 3:
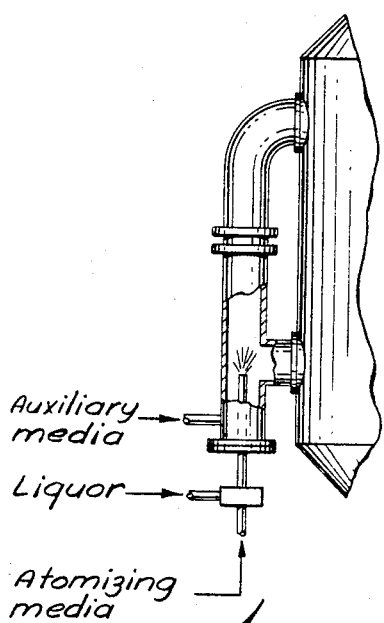
FIG. 3 is a side elevational view, partially cutaway and in section, of still another embodiment of a draft tube assembly in accordance with the present invention.

FIG. 3 shows another version of a draft tube assembly wherein the inlet portion thereof is perpendicular to the draft tube, the nozzle subassembly fitting into a lower pendent portion of the tube. This version may be referred to as having an L shape.

Figure 4:
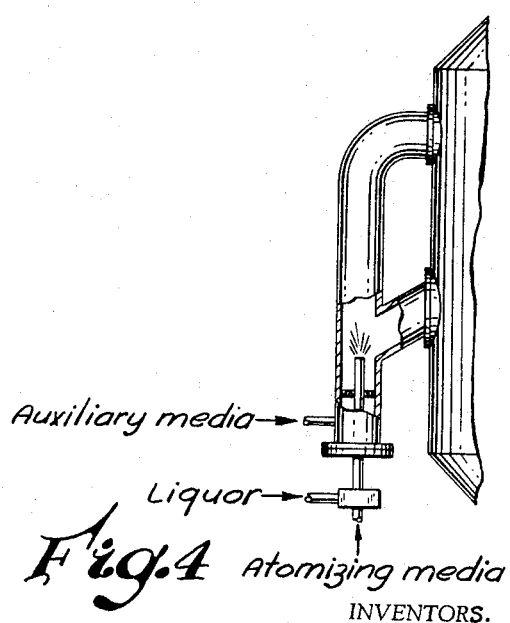
FIG. 4 is a side elevational view, partially cutaway and in section, of a further embodiment of a draft tube assembly in accordance with the invention.

FIG. 4 depicts a Y shaped draft tube assembly, the nozzle subassembly being inserted in a lower pendent portion thereof similarly as in FIG. 3.

Optionally, the draft tube assembly element of the present apparatus will embody a preferred structure referred to and described hereinafter as a concentric draft tube assembly. Accordingly, the following description will primarily relate to such embodiment.

CONCENTRIC DRAFT TUBE ASSEMBLY

The novel apparatus of the present invention employing the concentric draft tube assembly embodiment comprises (a) the aforesaid main chamber and (b) at least one so-called external concentric draft tube assembly. This assembly comprises a draft tube, a container spaced substantially concentrically around the lower portion and opening of said draft tube to enclose same, the space between the draft tube wall and container wall, being referred to herein as the interior of the concentric draft tube assembly, a fluid nozzle subassembly normally carried by a pendent portion of the concentric container, an inlet into the draft tube assembly carried by the container wall for admitting solids from the main chamber into the interior of the concentric draft tube assembly, and an outlet from the draft tube of the assembly into the main chamber for exiting solids therefrom. The fluid nozzle subassembly includes a multi-fluid nozzle, valved liquid and normally gaseous intake lines and a multi-orifice plate (described more fully hereinafter). The inlet opening in the wall of the concentric container (which corresponds to an opening carried by the wall of the main chamber A), communicating the interior of the concentric draft tube assembly with the main chamber, is normally located at a level at least somewhat above the lower end of the draft tube enclosed by the container.

Figure 6:
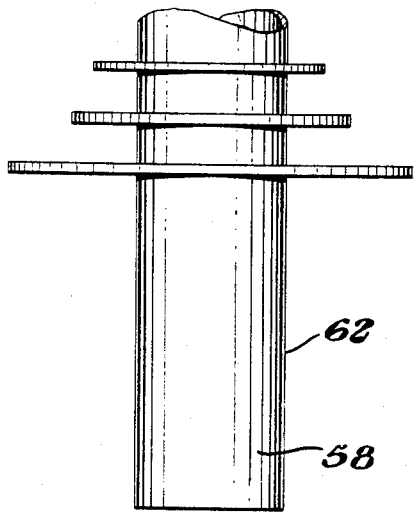
FIG. 6 is a side elevation view of the draft tube portion of the assembly of FIG. 5 including retaining or coupling flanges.
Figure 8:
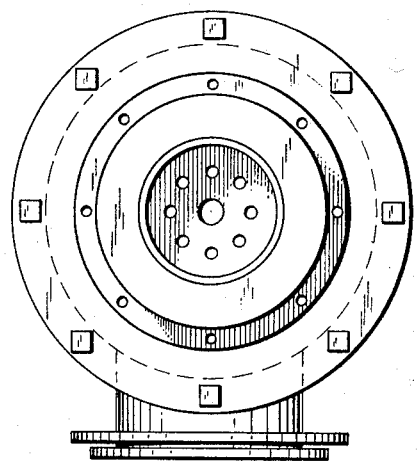
FIG. 8 is a plan view in detail of the concentric draft tube assembly of FIG. 7.
Figure 5:
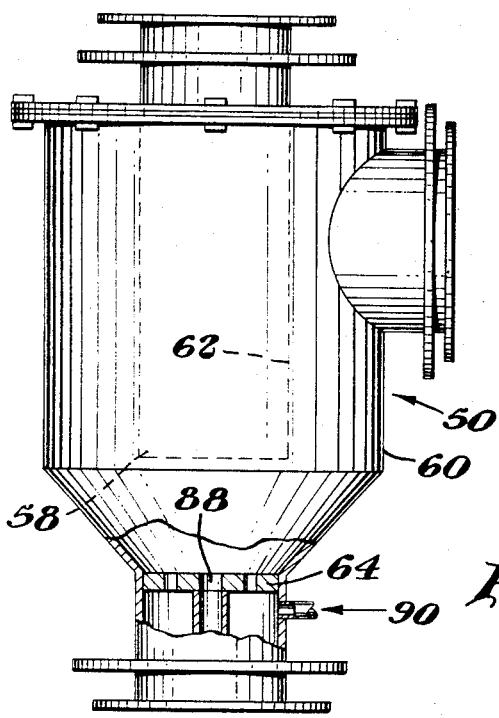
FIG. 5 is a side elevational view, partially cutaway and in section, in detail of one embodiment of an external concentric draft tube assembly of the apparatus of the present invention, less nozzle assembly, which may be employed in an apparatus in accordance with the invention such as shown, for example, in FIG. 1 or FIG. 9.
Figure 7:
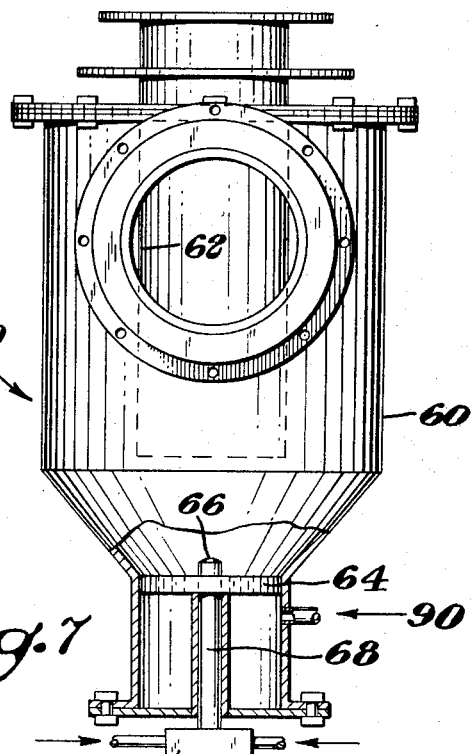
FIG. 7 is a side elevational view of another embodiment of a concentric external draft tube assembly, partially cutaway and in section, showing a nozzle subassembly carried by the lower portion of the draft tube assembly.

The lower portion of the draft tube of the concentric draft tube assembly is ordinarily, spacedly, longitudinally interposed into and from the top of the continuous walled container and is held, e.g., by bolts, such as shown, e.g., in FIGS. 5, 6 and 12, the container being otherwise essentially closed at its bottom and top. The upper portion of the draft tube extends out of the container and is in communication with the upper portion of the main chamber. The lower portion of the concentric container is normally pendently adapted or constructed to receive and is shown in FIGS. 9 and 12 disposed transverse to the longitudinal axis of the main chamber 16, it may be constructed and employed in various shaped and positions, such as, for example, as a cone or frustum. Being gas permeable, the grid plate 34 is adapted to retain a bed of particles in the main chamber while admitting forced primary media gases at a positive pressure (relative to the pressure in the upper portion of the main chamber above the pellet bed) as generated by said fan 28 and heater means 30. Discharge means are also provided and carried by the bottom portion of the present apparatus for withdrawing various sized particles from the pellet bed. Such means may include, for example, an enclosed heated or unheated chute 38, normally adapted with an air lock valve 40, and pellet classifier means 42 such as a series of gauged screens or sieves. The chute 38 in communicating the final drying subzone of main chamber 16 with the classifier means 42 extends downwardly from and through the grid plate 34 and plenum wall 44. Other suitable means for withdrawing sized pellets from the main chamber 16 may also be employed in the present invention as well.

To the side wall 18 of the main chamber, as described aforesaid, by means of openings 46 and 48 (cooperating with those carried by the draft tube assembly 46' and 48') the main chamber is removably coupled to one or more external concentric draft tube assemblies, each such assembly being identified generally by number 50. One of these openings, as a pellet outlet 46 from the draft tube assembly, communicates with the upper internal portion of the main chamber above the preliminary drying zone of the pellet bed through the chamber wall 18. Another opening, as a pellet inlet 48 (generally extended) into the draft tube assembly, communicates the interior 52 of the concentric draft tube assembly with the pellet bed in the main chamber 16. In general, the bed volume or depth between the grid plate 34 of the main chamber and the pellet inlet 48 into the draft tube assembly serves (when employed) and is indicated herein as a final pellet drying subzone, the pellet bed volume above said pellet inlet and below the pellet outlet 46 above being designated as a preliminary drying superzone. These zones may be adjustably varied in depth depending on the location of the pellet inlet 48 and outlet 46 and different type and size of pellet products. While the exact location of said openings is not particularly critical, they may be vertically as far apart as operatively practical, consistent, e.g., with the purpose of obtaining good recycle flow, inventory, and drying of the particles in the bed of the main chamber 16. Means may be provided, such as, for example, by slide gates 54 (see FIG. 12) or valves means, at said openings to close or restrict same as may be found necessary in operation of the apparatus. In addition, gauges and indicia means 56 in general may be provided at suitable and appropriate points around and about the apparatus to enable knowledgeable manipulation of pressures, flows, temperatures, etc. to be controlled in operating the novel method and apparatus of the invention.

In further reference to the drawings, normally the lower portion 58 of the draft tube of the assembly 50 will extend well into the concentric container 60. The lateral distance between the lower draft tube wall 62 and position the aforesaid nozzle subassembly. As will be described more fully herein, the multi-orifice plate component of the nozzle subassembly may be provided as a part of the draft tube assembly substructure as shown in FIG. 5, or as a part of the nozzle subassembly as shown in FIG. 13 where it is shown as coupled to the shank of the multi-fluid nozzle.

Vertically positioned into the lower pendent portion or structure of the concentric container, or, in the pendent leg of the draft tube, depending on the embodiment of the invention employed, is the fluid nozzle subassembly. The head or tip of the nozzle will be flush with the multi-orifice plate or may extend into the container (or draft tube) to an extent approaching the opening of the lower end of the draft tube within the assembly, or, it may extend into the draft tube itself. Specifically, the nozzle subassembly comprises a fluid nozzle, preferably a multi-fluid nozzle, a valve block at one end of said nozzle remote from the nozzle tip, and liquor inlet feed lines into said valve as well as an atomizing media gas inlet line. The nozzle tip and valve block are normally separated by an extender member to provide sufficient length to the nozzle to permit it to be inserted at least flush, or, well into the draft tube assembly (or draft tube), as shown, e.g., in FIG. 13. Construction of the fluid nozzle in general is such as to permit flow therethrough of the concentrated or dilute liquor to be treated concurrently with an atomizing gas such as air (which gas may also be a reactant). The particular nozzle tip employed whether of a pressure, syphon, or other type provides for the atomization of said liquid and its application on the pellets as they pass into and through the draft tube of the draft tube assembly.

As aforesaid, the multi-orifice plate is normally coupled to the nozzle at or near its tip for insertion into the draft tube assembly. For convenience, the multi-orifice plate is adapted with suitable guide and stop means, such as a centrally located pipe into which the nozzle may readily be positioned and held, such as shown, e.g., in FIG. 5.

To further illustrate and aid in understanding of the present invention, reference is made to the drawings, particularly to the embodiments shown in FIGS. 9 and 12, wherein there is shown a main chamber 16, as a vertically disposed, elongated cylindrical column having a continuous chamber wall 18. The chamber wall being made, for instance, of mild steel (with or without a refractory lining) is adapted with enclosed hood means 20, carried by and coupled to the upper portion of the main chamber wall 18. Carried by the hood means 20 is an exhaust fan 22 to evacuate gaseous media from the apparatus, and if desired scrubber means 24 such as, for example, a cyclone separator and spray scrubber to clean said gaseous media and recover solids (fines), etc.

The bottom arrangement of the main chamber 16 is shown as a plenum 26 which is adapted with a fan means 28 and heater means 30 as a source of the aforesaid primary media drying gases. Interposed between the plenum 26 and bottom portion of the main chamber 32 is a grid plate 34 containing a great multiplicity of perforations, representatively indicated by number 36. While this grid plate 34 container wall 60 will, for example, be a distance of from about 5–7 to about 10–14 times the diameter of the largest pellets flowing through the apparatus. These proportions, however, are not intended to be limiting and they depend on a number of variables, in operating the present apparatus, such as, for example, the amount and pressure of primary media and other gaseous media employed, pellet density, and other operating variables apparent herein. In any event, said lateral distance will be sufficient to prevent bridging by particles between said walls. Normally, the vertical distance between the lower end 58 of the draft tube within the container 60 and the multi-orifice grid plate 64 (hereinafter described) will (but not necessarily) be substantially equivalent to the cross-sectional size of the draft tube. However, the apparatus of the invention is operable when the nozzle is positioned at distances greater or less than said draft tube cross-sectional size distances, and also is operable in cases where the nozzle tip 66 actually protrudes into the draft tube.

FIGS. 11 and 13 show in detail a multifluid nozzle subassembly in accordance with the present invention as comprising a multifluid nozzle 68, shown in FIG. 11, having a nozzle tip 66 at one end and threaded inlet means 70 and 72 at the other end for admitting a liquid mixture 74 to be treated, and an atomizing gas 76 for atomizing or spraying the liquid mixture, and, optionally, a multiorifice plate 64. The nozzle subassembly is housed or enclosed by the lower or pendent portion of the concentric container to an extent such that at least the nozzle tip and shank are so enclosed. The threaded liquid inlet 70 and threaded atomizing gas inlet 72 are shown leading into a valve 78, wherein, for example, the liquid 74 is caused to proceed through a center passageway 80 of the nozzle (as shown by the solid line arrows) and the atomozing gas 76, into an annular space 82 around the center passageway 78 (shown by dotted arrows), both the liquid and gas exiting at the nozzle tip 66 as an atomized liquid or spray. A threaded plug 84 as a clean out opening is also shown in the valve block 78. The multi-orifice plate 64 is shown in FIG. 13 as coupled to the nozzle shank 68 near the tip 66. As aforesaid, the plate 64 may also be constructed as part of the concentric container 60 as shown in FIG. 5, where the plate 64 is attached to the container wall 60 in a position transverse to the longitudinal axis of said container. A plurality of orifice openings 86 are provided in the multi-orifice plate located around a central opening 88 therein adapted to receive the multifluid nozzle 68. An auxiliary media gas 90 is introduced into the lower or pendent portion of the draft tube assembly through the orifice openings 86 in the plate 64 before entering the draft tube proper. Specific examples of nozzles and set-up arrangements are described in the examples following which further illustrate the invention.

FIG. 12 shows an isometric view of an apparatus in accordance with the present invention comprising an external draft tube assembly 50 and a main chamber 16, the assembly being in communication with the main chamber by an inlet 48 and an outlet 46 which are opened or closed by means of independent slide gate arrangements 54 carried by the wall of the main chambtr 18. Each slide gate (not shown in detail) comprises essentially two flange plates coupled to the chamber side wall and spaced apart sufficiently to accommodate and permit movement of a close fitting gate member. The gate member has holes therein corresponding to the inlet 48 and outlet 46 openings both in the chamber side wall 18 and of the draft tube assembly such that when all such openings and holes are in alignment pellets may pass between the main chamber 16 and assembly 50, and conversely, not pass when the holes are not in alignment.

Though the present apparatus, as depicted in the drawings, is shown as having cylindrical cross-sections in the main chamber, draft tube and concentric container, other cross-sectional configurations and other arrangements of draft tubes and main chambers and containers may be employed without departing from the spirit or scope of the present invention and are intentionally contemplated as being within the scope of the present invention. For example, the main chamber may possibly comprise an elongated rectangular tank with a multiplicity or linear array of external draft tube assemblies along each longitudinal side thereof. Also, the chamber may be square in cross-section with a number of draft tube assemblies attached to each equal side of the square. Moreover, the draft tube and container, and assembly itself may be square or rectangular in cross-section.

It has been further discovered that longevity of operation of the apparatus and efficiency of the present device are increased by employing friction reducing or anti-stick means or materials at least on all internal surfaces, and at all points, where it is found build-up of material tends to occur. An extremely suitable and desirable friction reducing material is a fluorinated hydrocarbon solid known by the trade name of "Teflon," preferably Teflon TFE. Sheets of Teflon are laminated, coated, or otherwise affixed to the aforesaid surface as needed. The internal wall surface of the draft tube is the primary surface desired, e.g., to be coated with said Teflon.

One of the most important features of the present invention lies in the facility of the apparatus to be serviced or cleaned without the necessity of shutting down the complete apparatus. For example, if the particular draft tube assembly through extended use, or even misoperation, becomes plugged, inoperable, or inefficient due to the excessive build-up of material, the side gates, e.g., as shown in FIG. 9, or other suitable closure means is simply actuated to seal off or close the inlet and outlet to the plugged draft tube assembly from the main chamber. The draft tube is then disengaged from the main chamber and assembly by removing necessary bolts from retaining flanges, whereupon the draft tube is removed from the inside of the container and cleaned, including the various parts of the nozzle assembly, feed lines, atomizing lines, etc. The other draft tube assemblies which are not plugged are, of course, continued in operation during the cleaning of the plugged assembly. The clean parts are then reassembled and connected to the main chamber again in reverse procedure and and the slide gate opened. By such flexibility, the present novel and unique apparatus may be operated almost indefinitely in cases where a plurality of external draft tubes are in operation, servicing one at a time as needed, leaving the others, as aforesaid, in operation during the servicing of the one.

It has been found, however, through actual extended operations of a particular embodiment of the present apparatus, that very little build-up occurs within the main chamber and draft tube assembly, particularly when means are employed to reduce friction and adherence of the material being treated on the internal walls of the device. Thus, it is ordinarily only the draft tube which may need servicing or cleaning occasionally. Use of Teflon lining almost completely eliminates even this servicing.

In any event, the present apparatus is highly unique in that it has to provision described of being serviceable during essentially complete operation, a facility which few apparatuses of any kind possess. Moreover, the unique arrangement and ready accessability of the essential elements of the invention permit easy observation and control of the operation of the device. Capacity of the apparatus may also be readily controlled by regulating the number of draft tube assemblies and whether or not they are in operation.

In operation of the method and apparatus of the present invention, any material which, in general, is susceptible of being put into a liquid mixture may be treated by means of the present invention for deposition and drying on a base substance.

For example, alkali metal and alkaline earth metal halide salts, heavy metal salts, complex salts, and any other compounds or materials capable of being dissolved to dilute, saturated, or super-saturated solution may be processed by the method and apparatus of the present invention. For example, as pellets, calcium chloride (anhydrous and semi-anhydrous), sodium hydroxide and sodium carbonate, iron chloride (and if oxidized at elevated temperature-$Fe_2O_3$), Daxtron (potassium salt of 2,4-dichloro-4-pyridinol) sodium salicylate, magnesium sulfate, sodium bromide, sodium trichloroacetate, and the like may be processed. In addition, molten material may be processed in the apparatus, with some modification, including slurried materials.

Size of the pellets obtained by operation of the apparatus of the present invention will depend to a large extent on residence time, the recycle rate, liquor flow rate, type of material, pressure and flow of auxiliary and primary media, and the like, and the size of the apparatus of course. Particles ranging from 1/16 inch to 1/2 inch are readily obtained. Finer particles may also be produced as well as pellets up to several inches in diameter, depending, of course, on the aforesaid variables. Ordinarily, longer residence periods produce the larger sized pellets.

While the examples, which follow hereinafter, provide in detail a description of the procedural steps, mechanical manipulations and general operating conditions of the invention, the present novel continuous method comprises the combination of steps and requirements of (a) providing an apparatus comprising at least one draft tube assembly and a separate main chamber as described hereinbefore in accordance with the invention, (b) establishing a moving and/or fluidized bed of particles in said main chamber (depending on the material being processed), (c) recycling the particles of said bed through said draft tube assembly by maintaining a pressure differential between the upper and lower portions of the main chamber and particulate bed with the lesser pressure at said top portion, (d) introducing a fluid material desired to be applied as a coating on the recycling particles in the draft tube assembly, preferably as or by an atomized spray, thereby to deposit or coat said material on said particles to increase their size, (e) passing hot drying gases to and through the bed of recycling moving particles in the main chamber to remove moisture from said pellets, (f) withdrawing said gases from the upper portion of the chamber, and (g) withdrawing a portion of the particles as product from said main chamber, leaving the balance to be further recycled and contacted with said fluid material. As additional steps, the pellets withdrawn may be further classified as to size, etc., and the spent gases withdrawn from the main chamber may be scrubbed to remove fines, and/or recovered, etc., whereupon the removed fines may be fed back to the liquor of fluid material being processed for economy of operation or returned to the bed or draft tube assembly.

It is preferred in the method of the present invention when recycling the particles of the pellet bed through the draft tube, to introduce auxiliary media gases (preferably through the aforedescribed multi-orifice plate), and/or atomizing gaseous media through a bifluid nozzle, under positive pressure to assist upward movement of pellets in the draft tube. Hydraulic nozzles may also be employed with no atomizing media gases.

In general, in the method of the present invention, the temperature of the liquor material being processed (atomized) must be at least sufficient to avoid solidification of said liquor in the apparatus and lines. The operating temperature in the draft tube assembly for the most part, as well as in the main chamber, together with the liquor concentration and feed rate, determines to a large extent physical and chemical characteristics such as density, pellet surface, etc., of the product. For example, temperature and liquor feed rate primarily determines whether the pellet surface will be smooth or irregular.

The atomizing media gas has, of course, as its prime function to atomize the liquor being processed and, secondly, to pump material up through the draft tube. It also, however, controls the physical characteristics of the product. The atomizing media, while normally air, may also be steam or a steam-air mixture, as well as most any type of gas, inert or reactive, depending on the product being made.

The auxiliary media which is introduced through the multiple orifice plate in the draft tube assembly has a prime function to act as a pneumatic pump to move particles upward through the draft tube portion of the draft tube assembly. Such media may be heated.

The hot drying gases (primary media) passed through the constantly changing bed in the main chamber are only limited in temperature by the melting point of the material of said bed, the major purpose of the drying gases being to dry the particles in the bed as well as to provide some mobility or movement or fluidization of the bed, as may be desired or necessary. This primary media may be, for example, hot flue gases generated by a heater such as a gas fired furnace, etc.

It appears to be essential in operation of the method of the invention that a pressure differential be maintained in the main chamber. That is, a greater net pressure must be maintained in the lower portion of the chamber and bed than in the upper portion thereof over the bed. This may normally be accomplished in part by effect of the pressure drop of the drying gases passing through the bed together with the generation of a deliberate negative pressure (vacuum) caused in the upper portion of the chamber to obtain the degree of desired pressure differential.

The following examples serve only to illustrate the present apparatus and method of the invention and are not to be construed in any way as limiting the invention thereto.

Examples I, II and III

In order to prepare pellets of anhydrous $CaCl_2$, in accordance with the present invention, an apparatus was constructed substantially as shown in FIG. 1 of the drawings, except that a single external draft tube assembly was employed having a 4 inch diameter draft tube. The main chamber of the apparatus was about 20 inches in diameter. A calcium chloride liquor was next provided of a predetermined certain concentration in percent solids and heated to an elevated temperature. Next, the apparatus was warmed up and dried out in preparation for use by turning on the primary media fan at the bottom of the apparatus, the exhaust fan at the top, turning on the burners to heat the primary media, opening all valves, except the liquor flow control valve, and starting the pump employed without turning on the valve to pump the calcium chloride liquor into the draft tube assembly through a bifluid pneumatic atomizing nozzle number 1/2" J. set-up No. 70 made by the Spraying Systems Co. (valve closed). The main chamber of the apparatus was charged with 400 pounds of calcium chloride (seed) material onto which the liquor would be atomized and sprayed. Flow of said seed particles through the external draft tube assembly was prepared for by opening the upper slide gate communicating the draft tube of the assembly with the upper portion of the main chamber. Both the auxiliary media and atomizing media were turned on by opening appropriate valves and their pressures adjusted, whereupon the lower slide gate communicating the main chamber with the interior of the draft tube assembly was opened to start the flow of calcium chloride (seed) through the draft tube assembly, and the calcium chloride liquor flowed to the nozzle was started and the rate of flow adjusted. The calcium chloride liquor line was previously preheated, with such heating continued during the entire operation. The apparatus now being in operation, the level of particles in the main chamber was adjusted to just below the upper slide gate opening and the particle draw-off valve (at bottom of apparatus) adjusted.

From the data and product obtained from 8 1/2 -hour runs, net yield of product was calculated together with the water evaporation rate in pounds of water per hour and pounds per hour per square foot of main chamber (cross-sectional area), mesh distribution of product, moisture content of product and the resultant B.t.u. requirement per pound of evaporated water and per ton of product.

Data as to types of material, flow rates, temperatures, pressures, net yield, evaporation rates, particle size of product, heat requirements, etc., are present in the following table for Examples I, II and III.

TABLE FOR EXAMPLES I, II, AND III

|  | I | II | III |
|---|---|---|---|
| $CaCl_2$ Liquor: |  |  |  |
| Percent Concentration (solids) | 45 | 55 | 58 |
| Temperature (° C.) | 75 | 69 | 140 |
| Flow rate (lbs./hr. of solids dry) | 108 | 89 |  |
| Primary Media | A+C | A+C | A+C |
| Temperature (° C.) | 315 | 322 | 320 |
| Pressure (Avg. inches of Hg) | 1.7 | 1.2 | 1.2 |
| Superficial Velocity (ft./sec.) | 7.8 | 6.0 | 6.1 |
| Auxiliary Media | A | A | A |
| Temperature (° C.) | 20 | 23 | 24 |
| Pressure (p.s.i.g.) | 59 | 49 | 54 |
| Atomizing Media | A | A | S |
| Temperature (° C.) | 98 | 22 | 160 |
| Pressure (p.s.i.g.) | 38 | 39 | 85 |
| Net Yield of Product (lbs./hr.) | 102 | 89 | 110 |
| Percent Moisture | 0.16 | 0.19 | 0.29 |
| Bulk Density (lbs./ft.$^3$) | 64.9 | 62.3 | 52.8 |
| Water Evap. Rate: |  |  |  |
| Lbs./$H_2O$/hr. | 130.9 | 72 | 99.9 |
| Lbs./hr./ft.$^2$ of main chamber | 60 | 33 | 46.8 |
| Mesh Distribution: |  |  |  |
| Percent on 4 mesh | 20.6 | 2.1 |  |
| Percent on 8 mesh | 74 | 67.3 |  |
| Percent on 20 mesh | 5.2 | 30.5 |  |
| Percent on 40 mesh | 0.1 | 0.1 |  |
| Balance-fines | 0.1 | 0 |  |
| B.t.u.'s Requirement: |  |  |  |
| Per lb. evap. $H_2O$ | 2,320 | 2,810 | 2,320 |
| Per ton product (millions) | 5.98 | 5.05 | 4.22 |

A=air; C=combustion gases; S=steam.

The calcium chloride pellets obtained from Examples I, II and III were substantially spherical in form, semi-anhydrous (less than 0.3 percent water remaining), hard and durable. They were homogeneous and appeared to be produced by a gradual build-up of coating over a number of recycles as opposed to an agglomeration of smaller pellets.

Also during the running of Examples I, II and III, the openings between the main chamber and draft tube assembly were closed to enable cleaning of the said assembly, as hereinbefore described, while the primary media gases were continued to be passed through the bed in the main chamber countercurrent to the downward moving solids. After cleaning (requiring a few minutes), the draft tube assembly was again put in operation by opening the inlets and outlets to the main chamber and again causing a flow of auxiliary and atomizing media gases and of solution therethrough.

Had the apparatus comprised more than one draft tube assembly, the assembly or assemblies not being cleaned could readily have continued in operation during cleaning of the one.

Examples IV through X

Using essentially the same procedure as in Examples I through III, the following materials (liquors) were processed through an embodiment of the present invention employing a single draft tube assembly and a main chamber diameter as follows:

| Example | Liquor | Main Chamber Dia., Inches |
|---|---|---|
| IV | Daxtron | 20 |
| V | Na Salicylate | 8 |
| VI | $MgSO_4$ | 8 |
| VII | $CaCl_2$ | 20 |
| VIII | $CaCl_2$ | 20 |
| IX | $CaCl_2$ | 20 |
| X | $FeCl_2$ | 8 | the results and conditions under which each example was run is presented in the following table, as well as the thermal efficiency of each run.

TABLE FOR EXAMPLES IV–X

|  | IV | V | VI | VII | VIII | IX | X |
|---|---|---|---|---|---|---|---|
| Liquor: |  |  |  |  |  |  |  |
| Percent Concentration (solids) | 48 | 50.9 | 34.2 | 56.5 | 60.4 | 50.6 | 36. |
| Temperature (° C.) | 35 | 61 | 74 | 91 | 96 | 81 | 2 |
| Flow rate (lbs./hr. of solids) | 43.4 | 11.4 | 14.7 | 193 | 247 | 132 | 5. |
| Primary Media | A+C | A | A | A+C | A+C | A+C | A |
| Temperature (° C.) | 262 | 197 | 319 | 351 | 355 | 299 | 245 |
| Pressure (Avg. inches of Hg) | 0.9 | 1.4 | 2.4 | 1.6 | 1.6 | 2.1 |  |
| Superficial Velocity (ft./sec.) | 4.5 | 5.5 | 7.3 | 6.5 | 7.4 | 6.7 | 5 |
| Discharge Temperature (° C.) | 105 | 92 | 91 | 119 | 123 | 117 | 78 |
| Auxiliary Media | A | A | A | A | A | A | A |
| Temperature (° C.) | 25 | 155 | 31 | 25 | 25 | 25 | 25 |
| Pressure (p.s.i.g.) | 56 | 30 | 30 | 57 | 51 | 55 | 40 |
| Atomizing Media | A+S | A+S | A+S | A+S | A+S | A+S | A+S |
| Temperature (° C.) |  | 66 | 104 | 30 | 30 | 30 | 25 |
| Pressure (p.s.i.g.) | 55 | 41 | 40 | 31 | 30 | 30 | 52 |
| Water Evap. Rate: |  |  |  |  |  |  |  |
| Lbs./$H_2O$/hr. | 64.1 | 11.7 | 23.6 | 148 | 162 | 129 | 10 |
| Lbs./hr./ft.$^2$ of main chamber | 29.4 | 33.5 | 67.6 | 67.9 | 74.4 | 59.2 | 28 |
| Net Yield of Product (lbs./hr.) | 36.0 | 11.4 | 19.0 | 166 | 211 | 102 | 4.2 |
| Percent Moisture | 0.2 | 0.3 | 22.6 | 1.27 | .65 | .45 |  |
| Bulk Density (lbs./ft.$^3$) |  | 52.3 | 63.5 | 55.8 | 50.9 | 55.8 |  |
| Lbs./hr./ft.$^3$ of main chamber | 16.5 | 32.7 | 54.4 | 76.1 | 96 | 46.8 | 12 |
| Mesh Distribution of Product: |  |  |  |  |  |  |  |
| Percent on 4 meash |  | Nil | .4 | .8 | 1.3 | 3.3 |  |
| Percent on 8 mesh |  | 73.1 | 33.1 | 85.0 | 98.6 | 96.7 |  |
| Percent on 12 mesh |  | 13.6 | 29.5 |  |  |  |  |
| Percent on 16 mesh |  | 5.5 | 15.1 |  | .02 |  |  |
| Percent on 20 mesh |  | 5.7 | 8.4 | 1.4 | Nil | .04 |  |
| Percent on 40 mesh |  | 0 | 8.9 | 0.2 |  | Nil |  |
| On pan |  | 2.1 | 4.6 | Nil | Nil | Nil |  |
| B.t.u. Requirement: |  |  |  |  |  |  |  |
| Per pound evap. $H^2O$ | 2,400 | 2,100 | 1,800 | 1,810 | 1,875 | 1,975 | 2,600 |
| Per ton product (millions) | 8.55 | 4.2 | 4.5 | 3.23 | 2.88 | 5.0 | 12 |
| Thermal Efficiency | 41.7 | 47.6 | 55.6 | 55.2 | 53.3 | 50.7 | 38.4 |

A=air; C=combustion gases; S=steam.

In Examples IV through X, it should be noted that the high thermal efficiency of the apparatus of the invention is unexpected and quite outstanding, exceeding in most cases about 40 percent and reaching about 55 percent. It is contemplated, moreover, that thermal efficiencies, e.g. approaching 60 percent or higher may be obtained in the device of the present invention, depending, of course, on the materials to be processed therein. These examples, in addition to showing that anhydrous as well as hydrous products may be made, show the great range of operating temperatures employable in the present device, and the different types of products made.

Solids obtained from the present invention are highly desirable particulate or pellet products which are hard, free flowing, and dense, and which may be stored for prolonged periods without caking. Many such products so obtained are only obtainable conventionally by means of complicated apparatus and lengthy process steps.

While Examples I through XX illustrate only a few of the materials infinitely possible for processing in the present apparatus, other and greatly varied solutions, slurries, or even molten materials may be accommodated by the invention by making various changes and/or modifications to the present apparatus without departing from the spirit or scope of the invention contemplated and claimed, and it should be understood that the invention is only limited as defined in said claims, which are appended hereto.

We claim:

1. A device for treating liquid mixtures to recover solids therefrom comprising (A) a main chamber element adapted to contain a bed of particulate solids therein and (B) at least one draft tube assembly element externally coupled to the main chamber and adapted to communicate a lower portion of said main chamber with a top portion thereof, said main chamber being adapted by plenum means for forcibly introducing drying gases therethrough, hood means for exhausting gaseous media from the main chamber, grid plate means interposed between the plenum means and main chamber adapted to admit said drying gases therethrough from the plenum means into said main chamber and to support said bed of particulate solids, and means for withdrawing particulate product from the main chamber; each draft tube assembly element comprising an externally positioned draft tube passageway for recycling a flow of particulate solids through the interior thereof from the lower portion of said main chamber to the upper portion thereof, and a fluid nozzle subassembly carried by the draft tube, the nozzle subassembly comprising a fluid nozzle having a nozzle tip capable of atomizing a liquid mixture, and fluid mixture inlet means for said fluid nozzle, said nozzle tip extending into the draft tube sufficiently to at least communicate with the interior thereof.

2. A device for treating liquid mixtures and recovering a pelletized solid consisting essentially of (A) a walled main chamber element having a designated final drying subzone and a designated preliminary drying superzone and (B) at least one draft tube assembly externally coupled to the wall of the main chamber; said main chamber comprising plenum means for forcibly introducing heated primary gaseous drying media thereinto from one end of the main chamber proximate to the final drying zone, hood means for withdrawing gaseous media from the main chamber carried by the end of the chamber remote from said plenum; a gas permeable grid plate interposed between the final drying subzone in said chamber and said means for introducing said gaseous drying media, said grid plate being adapted to admit said primary media gases and support a bed of solid pellets in the main chamber; means for controllably withdrawing solids from the final drying zone of the main chamber; the draft tube assembly (B) comprising a draft tube passageway positioned externally of and adjacent to the main chamber communicating the lower interior portion of the main chamber by draft tube inlet means with the upper interior portion of the main chamber by draft tube outlet means, thereby to admit a flow of solids from the main chamber, through the draft tube interior and back into the main chamber in a recycling manner, there being a pendent housing coupled to said draft tube passageway adapted to carry a nozzle subassembly comprising a multi-fluid nozzle having a nozzle tip at one end and an inlet end equipped to receive a liquid mixture to be processed and to receive gaseous media for the purpose of atomizing said liquid mixture into a spray at the nozzle tip, and a multi-orifice plate coupled to the nozzle at a point between the tip and nozzles inlet end, the nozzle tip being in communication with the interior of the draft tube, the pendent housing being further adapted for introducing an auxiliary gaseous media thereinto through the multi-orifice plate into the draft tube.

3. A device for treating liquid mixtures and recovering a pelletized solid consisting essentially of (A) a walled main chamber element having a designated final drying subzone and a designated preliminary drying superzone and (B) at least one draft tube assembly externally coupled to the wall of the main chamber; said main chamber comprising plenum means for forcibly intrducing heated primary gaseous drying media thereinto from one end of the main chamber proximate to the final drying zone, hood means for withdrawing gaseous media from the main chamber carried by the end of the chamber remote from said plenum; a gas permeable grid plate interposed between the final drying subzone in said chamber and said means for introducing said gaseous drying media, said grid plate being adapted to admit said primary media gases and support a bed of solid pellets in the main chamber; means for controllably withdrawing solids from the final drying zone of the main chamber; the draft tube assembly (B) comprising a draft tube passageway positioned externally of and adjacent to the main chamber communicating the lower interior portion of main chamber by draft tube inlet means with the upper interior portion of the main chamber by draft tube outlet means, thereby to admit a flow of solids from the main chamber, through the draft tube and back into the main chamber in a recycling manner, the draft tube assembly being adapted to carry and receive a multi-fluid nozzle, said nozzle extending into the draft tube sufficiently to contact an atomized spray of said liquid mixture through said nozzle with the flow of solids in the draft tube, the draft tube being further adapted with means to receive auxiliary media gases at a point near the nozzle to pneumatically aid in the flow of solids through said draft tube.

4. The device of claim 2, wherein the draft tube assembly (B) comprises a draft tube having an upper portion, an outlet in the upper portion, a lower portion and an inlet in the lower portion, and a container essentially concentrically positioned around said lower portion and inlet, said container having a pellet inlet and also a pendent portion in which is carried a nozzle subassembly, said subassembly comprising a multi-fluid nozzle having a nozzle tip and shank, adapted to form a spray of said liquid mixture when passed therethrough, and an inlet end, a multi-orifice plate coupled to the nozzle, liquid inlet means and atomizing gas inlet means carried by the inlet end of the nozzle, said multi-orifice plate being carried by the nozzle shank and disposed between said nozzle tip and said nozzle inlet end, there being carried in said pendent portion of the draft tube assembly inlet means located at a point between said multi-orifice plate and the inlet end of the nozzle tip for introducing auxiliary media gases through said plate into the draft tube assembly.

5. A method of continuously treating liquid mixtures to recover particulate solids therefrom comprising: providing a moving bed of particulate solids in a walled chamber, said bed being supported therein by and on a grid plate element; forcibly passing drying gases from plenum means adjacent the chamber through the grid plate element and the particulate bed to dry and provide said movement to the particles in said bed; pneumatically recycling the particles of said bed through an external passageway from an interior portion of said chamber adjacent the grid plate to an interior chamber portion remote from the grid plate; introducing the liquid mixture to be treated as a spray applied as a coating on said recycling particles in said external passageway; withdrawing gaseous media from the chamber interior remote from the grid plate after said gases have passed through the particulate bed and; withdrawing amounts as needed of dried particles from the chamber as product.

6. The method of claim 5 wherein auxiliary gaseous media is introduced into the external passageway to pneumatically assist flow of particulate solids therethrough.

7. The method of claim 5 wherein gaseous atomizing media is introduced together with the liquid mixture through a fluid nozzle to atomize said liquid mixture into a spray for application on said recycling flow of particles through the passageway.

References Cited

UNITED STATES PATENTS

| | | | |
|---|---|---|---|
| 2,548,642 | 4/1951 | White | 263—53 |
| 3,152,005 | 10/1964 | Tuttle | 117—100 |
| 3,354,863 | 11/1967 | Reynolds | 118—62 |

JAMES W. WESTHAVER, *Primary Examiner.*

R. A. DUA, *Assistant Examiner.*

UNITED STATES PATENT OFFICE
CERTIFICATE OF CORRECTION

Patent No. 3,408,746            November 5, 1968

Jack B. Reynolds et al.

It is certified that error appears in the above identified patent and that said Letters Patent are hereby corrected as shown below:

Column 1, line 24, "atmozied" should read -- atomized --. Column 6, line 9, beginning with "position the" cancel all to and including "grid plate 34" same column 6, line 68, and insert the same in column 5, line 22, after "and". Columns 11 and 12, TABLE FOR EXAMPLES IV-X, fifth column, line 25 thereof, "1.4" should read -- 14 --; same table, eighth column, line 1 thereof, "36." should read -- 36.4 --; same table, same column, line 2 thereof, "2" should read -- 25 --; same table, came column, line 3 thereof, "5." should read -- 5.7 --; same table, same column, line 5 thereof, "245" should read -- 247 --.

Signed and sealed this 17th day of March 1970.

(SEAL)
Attest:

Edward M. Fletcher, Jr.           WILLIAM E. SCHUYLER, JR.
Attesting Officer                Commissioner of Patents